April 13, 1943.  A. PROCTER  2,316,713
FLUID SEALING AND DUST-EXCLUDING DEVICES
FOR SHAFTS, BEARINGS, AND THE LIKE
Filed Jan. 8, 1942

Inventor
ANTHONY PROCTER,
BY: Francis E. Boyce
ATTORNEY

Patented Apr. 13, 1943

2,316,713

UNITED STATES PATENT OFFICE 2,316,713

FLUID-SEALING AND DUST-EXCLUDING DEVICE FOR SHAFTS, BEARINGS, AND THE LIKE

Anthony Procter, Newcastle-upon-Tyne, England

Application January 8, 1942, Serial No. 425,990
In Great Britain February 3, 1941

3 Claims. (Cl. 288—3)

This invention relates to fluid-sealing and dust-excluding devices for relatively rotatable or displaceable shafts, bearings and the like, of the kind composed of or comprising a washer of pliable material held at one periphery directly or in a metal casing as a press fit in or on a machine part stationary relatively thereto, and presenting at the other periphery an axially directed flange portion pressed by a garter spring, which is usually an endless helically coiled wire spring, into contact with a machine part moving relatively thereto. These and similar devices are known as oil seals.

Usually a sealing lip is provided only at the actual extremity of the sealing flange of a sealing washer of an oil seal. It has, however, already been proposed to form an annular groove in the bearing surface of the spring-pressed sealing flange, whereby an additional sealing lip is provided directed in the same or opposite axial direction as or to the sealing lip at the extremity and conjointly pressed by the garter spring. It has also been proposed to seat the garter spring of an oil seal in an annular divergent groove on the sealing flange so that by the spreading of the groove the sealing lip at the extremity is urged into contact with the surface to be sealed, and in an oil seal of this kind it has also been proposed to provide a second sealing lip not pressed by the garter spring directed in the opposite axial direction to the sealing lip at the extremity of the sealing flange.

An object of the present invention is to ensure in an oil seal having a pair of sealing lips on the sealing flange, that the two sealing lips are both pressed by a single garter spring into effective contact with the relatively moving machine part.

For the above purpose, according to the invention, in an oil seal having a sealing flange pressed by a garter spring seated in an annular divergent groove on the sealing flange and also having a pair of sealing lips separated by an annular groove in the bearing surface of the sealing flange, the divergent substantially opposite spring-seating groove is located between the two sealing lips and opposite the lip-separating groove, whereby the spring can differentially radially displace both sealing lips.

The two sealing lips may be directed in the same axial direction or in opposite axial directions.

The oil seal may be what is termed an external oil seal in which case it is a press fit on a shaft whilst its sealing lips bear against and move relatively to the shaft housing, or it may be what is termed an internal oil seal in which case it is a press fit in the housing and its sealing lips bear against the moving shaft.

Representative examples of oil seals embodying the invention are illustrated on the accompanying drawing, in which.

Figure 1:
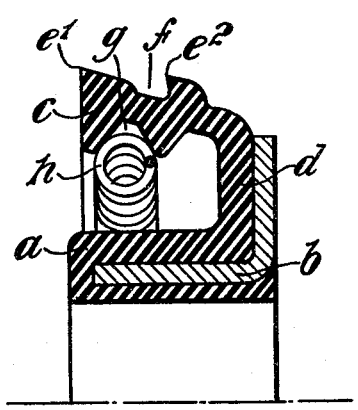
Fig. 1 is a half radial section of a casingless external oil seal.
Figure 2:
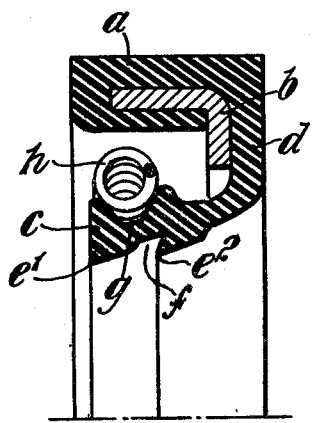
Fig. 2 is a half radial section of a casingless internal oil seal.

Referring more particularly to Figs. 1 and 2, the oil seal washer is composed for instance of oil-resisting synthetic rubber and is moulded with a massive holding portion $a$, reinforced by a metal insertion $b$, and presenting an axially directed sealing flange $c$ connected to the holding portion $a$ by a neck portion $d$.

Two sealing lips $e^1$ and $e^2$ separated by an annular groove $f$ are provided on the bearing surface of the sealing flange $c$.

Between the two sealing lips $e^1$ and $e^2$ and, of course, on the other side of the sealing flange $c$, and substantially opposite the groove $f$, a divergent groove $g$ is formed in the sealing flange $c$ wherein is seated a garter spring $h$. In the construction shown in Fig. 1, the oil seal being an external oil seal, the garter spring $h$ is in compression and tends to force the sealing flange radially outwards. In the construction shown in Fig. 2, the garter spring $h$ is in tension and tends to force the sealing flange radially inwards. In both cases the garter spring $h$ tends to spread the groove $g$ in which it is seated. Thereby when one sealing lip $e^1$ or $e^2$ is in contact with the surface to be sealed the spring $h$ by settling deeper into the groove $g$ continues to press the other sealing lip $e^2$ or $e^1$ into similar contact with the surface to be sealed, the sealing flange $c$ bending at the narrow neck portion provided by the opposed grooves $f$ and $g$.

As can be seen from the drawing, the annular groove $f$, in addition to being opposed to the annular groove $g$, is also so located and of such width as to extend closer to the neck $d$ than the groove $g$, thereby providing a zone of weakness about which the sealing flange $c$ can bend relatively to the neck $d$ and permit both the two sealing lips $e^1$, $e^2$ to bear against the machine part moving relatively thereto.

Figure 3:
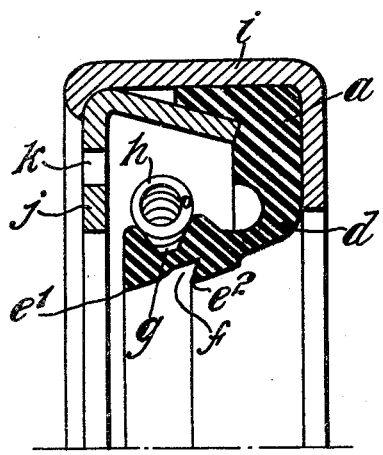
Fig. 3 is a half radial section of an encased internal oil seal.

The construction shown in Fig. 3, differs from that shown in Fig. 2 only in so far that the oil seal is a cased internal oil seal of which $i$ is the actual sheet metal casing and $j$ is the closure member thereof. Being a cased oil seal the holding portion $a$ is less massive and the metal reinforcement $b$ is omitted.

$k$ is a vent hole provided in the known manner in the closure member $j$ of the sheet metal casing $i$.

Figure 4:
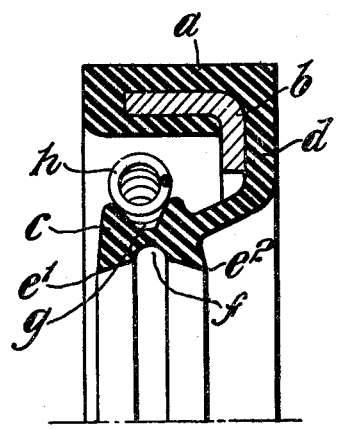
Fig. 4 is a half radial section similar to Fig. 2 but showing the sealing lips directed in opposite axial directions.

In the constructions illustrated in Figs. 1, 2 and 3, both the sealing lips $e^1$, $e^2$ are directed axially away from the neck portion $d$ of the oil seal washer. However, to serve for instance as a dust-excluding seal, whilst the lip $e^1$ serves as a fluid seal, the lip $e^2$ may be as shown in Fig. 4 directed in the opposite axial direction to the lip $e^1$.

I claim:

1. In an oil seal, a thin neck, an axially directed annular sealing flange on said neck formed with an annular divergent groove in the surface of said sealing flange remote from the bearing surface of said sealing flange, a pair of axially directed sealing lips on the bearing surface of said sealing flange and separated by an annular groove located substantially opposite said divergent groove and so located and of such width as to extend closer to said neck than said divergent groove, and a garter spring seated in said divergent groove.

2. In an oil seal, a thin neck, an axially directed annular sealing flange on said neck formed with an annular divergent groove in the surface of said sealing flange remote from the bearing surface of said sealing flange, a pair of like axially directed sealing lips on the bearing surface of said sealing flange and separated by an annular groove located substantially opposite said divergent groove and so located and of such width as to extend closer to said neck than said divergent groove, and a garter spring seated in said divergent groove.

3. In an oil seal, a thin neck, an axially directed annular sealing flange on said neck formed with an annular divergent groove in the surface of said sealing flange remote from the bearing surface of said sealing flange, a pair of oppositely axially directed sealing lips on the bearing surface of said sealing flange and separated by an annular groove located substantially opposite said divergent groove and so located and of such width as to extend closer to said neck than said divergent groove, and a garter spring seated in said divergent groove.

ANTHONY PROCTER.